United States Patent [19]

Torres

[11] Patent Number: 5,162,994
[45] Date of Patent: Nov. 10, 1992

[54] METHOD FOR DETERMINING DIP AND STRIKE ANGLES IN BOREHOLE ULTRASONIC SCANNING TOOL DATA

[75] Inventor: David O. Torres, Austin, Tex.
[73] Assignee: Halliburton Logging Services, Inc., Houston, Tex.
[21] Appl. No.: 540,255
[22] Filed: Jun. 19, 1990
[51] Int. Cl.⁵ .............................................. G06F 15/21
[52] U.S. Cl. ....................................... 364/422; 324/339
[58] Field of Search ................. 364/421, 422; 324/339

[56] References Cited

U.S. PATENT DOCUMENTS

5,095,272  3/1992  Sinclair ................................ 324/339

*Primary Examiner*—Gail O. Hayes
*Attorney, Agent, or Firm*—William J. Beard

[57] ABSTRACT

A method of data conversion is set forth. In this system, the amplitude of a borehole sidewall response is recorded as a data record. This includes a sinusoidal representation of an interface. Several points on the sinusoidal curve are transformed in parameter space to represent dip and strike of the interface. Multiple point transform provides quality data so that noise on the signal has reduced impact. The transform is the Hough Transform into parameter space. This can be used with BHTV to provide acoustic data representing the sidewall of the well.

11 Claims, 4 Drawing Sheets

METHOD FOR DETERMINING DIP AND STRIKE ANGLES IN BOREHOLE ULTRASONIC SCANNING TOOL DATA

BACKGROUND OF THE DISCLOSURE

This disclosure is directed to the use of data obtained by a borehole TV system (BHTV) wherein the data is used to define the dip and strike of strata or beds intercepted by the well borehole. In a broader aspect of the invention, the dip and strike of formations observed on the wall of the borehole by other types of sensors forming an image may be determined. Along a drilled well, the well borehole will intercept various and sundry formations defined by formation interfaces or boundaries, or perhaps fractures, or other indicia of formation position and orientation. In a simplistic way, formations generally are parallel with a dip subject to disturbances involving some geological event or associated fractures in the near vicinity. Alternately, the strata may be approximately horizontal, but the well may not be vertical as in the instance of slant drilling from an offshore platform. A dipmeter has been used heretofore to provide an indication of the fracture, strata or interface dip angle relative to the borehole.

It is now possible to place a centralized BHTV in a uncased well and to rotate the view so that information is obtained from the side wall of the uncased borehole. The output signal of the BHTV forms a strip of film, so to speak, as the BHTV is moved along the borehole and thereby provides an indication of the reflection from the side wall. The film is analyzed to detect fractures, strata, interfaces or other boundaries intercepted by the borehole. The scanned film thus includes an indicia where such formation interfaces, fractures, or changes in structure are intercepted. Dip and strike can be determined.

The film provided by such a BHTV will include an obscured sinusoidal waves in the data. If perchance the fracture or strata or other interface is substantially horizontal to a vertical borehole, it will be appreciated that the sinusoidal waveform will be reduced substantially to a straight line on the film. But, however, when a sinusoidal waveform is observed in the film data, it is indicative of a formation interface or some other aspect intercepted by the borehole which might be described in spatial orientation, i.e., by the dip and strike. The BHTV provides the output film where color intensity (often encoded in a gray code) will be involved in such a sinusoidal waveform. This film has contrasts in color, texture, etc. occurring where an interface or fracture is intercepted by the well borehole. Assume, for instance, that a sharply defined interface is intercepted by the borehole. In that event, the film should present the color contrast or texture contrast on the film as a sinusoidal waveform. Given this waveform in the data on the film, the present disclosure is directed to a method of processing the output data of a BHTV so that the data can be converted into information regarding the interface. The interface is primarily located by determining the dip and strike angles of the interface. This data can be obtained by measuring the amplitude and phase of the sinusoidal image in the film. The terms dip and strike have well known definitions when applied to interfaces, fractures, strata, etc.

With the advent of borehole imaging, a primary concern of the log analyst is to obtain dip and strike information from sinusoidal patterns found in these images. In the past, these solutions for the patterns were calculated manually, taking into account the effects of decentralization and borehole shape, see D. T. Georgi, "*Geometrical Aspects of Borehole Televiewer Images*", SPWLA 26th Annual Logging Symposium, Paper O, June 1985. More recently, these patterns are manually identified on workstations and fitted to sinusoids via the computer. See R. A. Plumb, S. M. Luthi, "*Analysis of Borehole Images and Their Application to Geologic Modeling of an Eolian Reservoir*" SPE Formation Evaluation Symposium, December 1989, pp. 505–514, J. K. Faraguna, D. M. Chase, M. G. Schmidt, "*An Improved Borehole Televiewer System: Image Acquisition, Analysis and Integration*" SPWLA 30th Annual Logging Symposium, Paper UU, June 1989 and Lyel, et al. "Method for Logging the Characteristics of Materials Forming the Borehole of a Wall" U.S. Pat. No. 4,780,857, Oct. 25, 1988. The amplitude and phase of these sinusoids, properly combined with caliper data, provide the dip and strike angles of relevant formation features.

A representative data collection device is known as the CAST tool. The CAST tool (Circumferential Acoustic Scanning Tool) is an enhanced version of the BHTV, is described on the principles of Zemaneck which produces two types of data; namely, amplitude and time of flight. The amplitude data measure the peak acoustic reflection of the borehole wall, and the time of flight determines the distance from the tool to the borehole wall. The tool acquires this information from a rotating sonic transducer located at the bottom of the sonde. The transducer is fired at a fixed but selectable rate ranging from 100 to 500 times per rotation. At each firing the tool measures the strongest echo (amplitude) and the time elapsed between the firing and the detection of its echo (time of flight). The tool typically rotates at different rates up to 120 times per vertical foot. The CAST tool may be used as described, or alternate forms of BHTV tools may be used. In any event, the tool forms an image or collection of images on a data record for use in accordance with the teachings of this disclosure. Other BHTV systems beside the CAST tool may be used.

The acquired and recorded information may be presented either as vertical or horizontal waveforms, or as two dimensional images. In the two-dimensional case, the horizontal dimension is produced by "cutting" the borehole along the north azimuth (or some other selected point) with the sidewall unrolling onto a flat film surface while the vertical dimension of the image corresponds to the depth of the tool. The value of the data at a particular depth and azimuthal coordinate is represented by an intensity level (amplitude). While the illustrated and preferred mode of data collection is a BHTV system, the present method also operates well with alternate methods of gathering data regarding the borehole wall. Where a data film is mentioned, the data can readily be on a film or recorded in some memory.

The process set forth hereinbelow contemplates operation of a BHTV in an uncased well borehole forming an output signal which is normally presented as pixels of color or gray tone in a memory, one organization thereof representing data on a strip of film. The data (in digital form) is first normalized relative to certain standards on a typical gray scale. The image is then enhanced in digital form primarily by digitally removing background noise. The data representing the scanned pixels in digital form encodes formation boundaries which are represented in a more contrasted fashion, e.g., black data on a white background, but still in a digital form. At this juncture, the enhanced and modified data in digital form will better represent formation boundaries, fractures, etc. in a sinusoidal waveform. The process continues by applying a Hough Transform to the data so that data points on a curve are, mathematically speaking, transformed into parameter space where the dip and strike angles are dimensions within parameter space. Accordingly, a single point (encoded in digital form) of a sinusoidal data curve in the binary data represents an entire curve in parameter space. By the choice of multiple points from a curve, different curves in parameter space can be presented. The loci of multiple points should cross or intercept at a common parameter space intercept. Since noise is always present, the intercept of the several loci may not be quite precise, but there will be a clear indication of the intercept. This enables determination of dip and strike angles which can then be output to identify the boundary.

Consider one example of data from an operative BHTV system. The data (after noise reduction) may have the form of a mix of binary ones in a field of binary zeroes. A simplistic two value, one bit system is assumed for tutorial purposes; in actuality, a multiple bit data representation is used so that the multiple values range between black and white and include various gray tones. The number of tones is normally a multiple of two, for instance, a total of thirty-two or sixty-four tones may be used. In this regard, some dividing line is defined between black and white so that the data can be processed through further steps. Assume that a stretch of borehole has been encoded by 300 revolutions of the BHTV and that each revolution is divided into 360 data points. This defines a block of data which is 108,000 pixels. Those which show a data entry above a selected value of color or tone are encoded as a binary one in two value system while all the remaining pixels are encoded as zeroes. Each data entry represents a possible point on a sinusoidal curve, therebeing the possibility of several or perhaps no interfaces in the data. Each data point (representing a pixel) is transformed. After the transform, those data common to an interface will collectively indicate that particular interface with strike and dip. By contrast, data not resultant from an interface will not collectively indicate an interface and will therefore be easily discarded.

The images contain information about borehole events, shape, and formation properties. In general, the borehole events are classified as either vertical or horizontal features. Vertical events correspond to vertical fractures, pad marks, etc. Horizontal events, on the other hand, correspond to fractures intersecting the borehole at oblique angles, to erosions of an interface between bedding planes, to dipping formations, etc. The horizontal events are the only events of interest in the ensuing discussions.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a typical sinusoid of the sort shown in FIG. 2 showing specific data points thereon where FIG. 4 is plotted in image space;

DETAILED DESCRIPTION OF THE PREFERRED EMBODIMENT

When the images of a dipping event are projected onto a flat surface, the points of the images satisfy the following relationship:

$$\delta z = r(\phi, z + \delta z) \tan(\alpha) \sin(\phi - \beta) \quad (1)$$

where:
 $z=$ depth of the center of the event;
 $\phi=$ angle between north and the imaged point;
 $\delta z=$ distance between the center of the pattern and the imaged point;
 $\alpha, \beta=$ dip and strike angle of the dipping event; and
 $r(\phi, z+\delta z)=$ radius of the borehole at point ($\phi$, $z+\delta z$).

Figure 2:
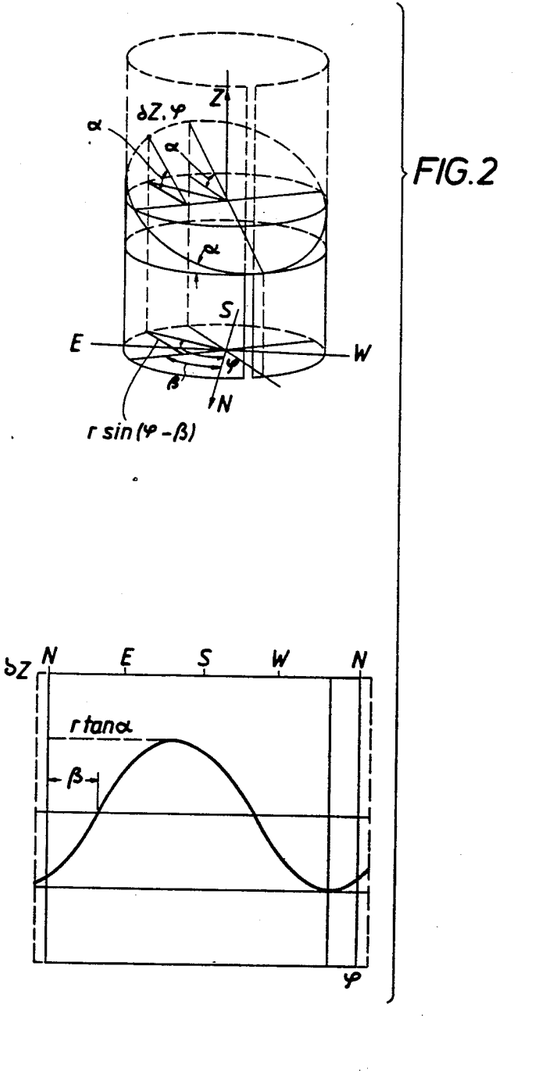
FIG. 2 shows a cylindrical borehole intercepted by a dipping plane referenced to north and the vertical axis Z where $\alpha$ and $\beta$ are the dip and strike angles of the plane, and further showing the edge of the plane intercepting the cylindrical borehole when displayed as a two dimensional plot where the dimensions are location along the Z axis and azimuth.
Figure 3:
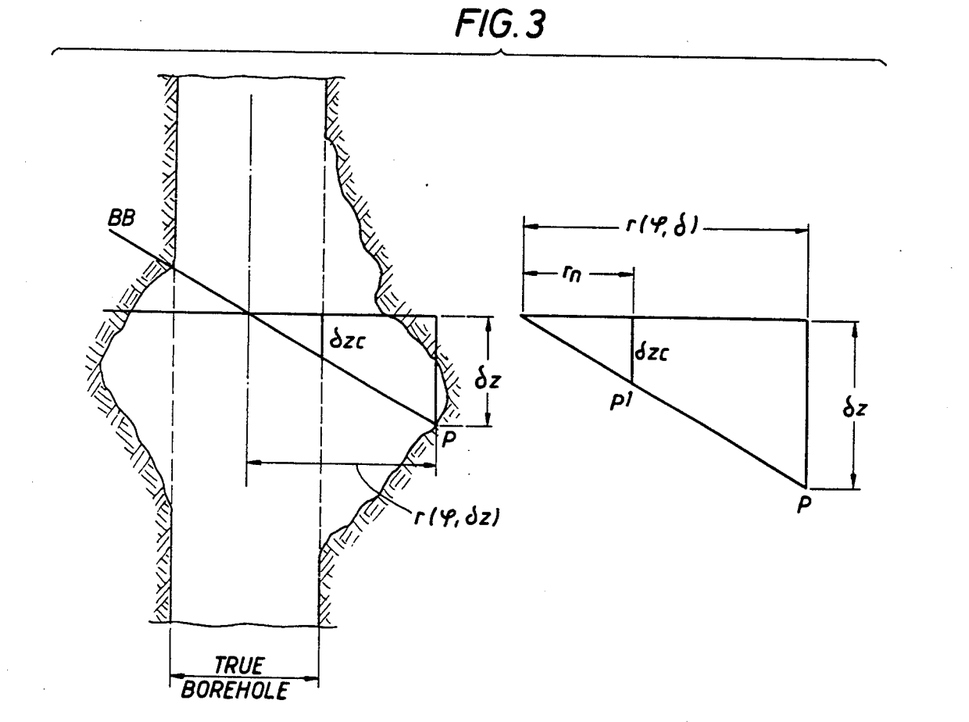
FIG. 3 is a view derived from FIG. 2 showing a washout from a true or cylindrical borehole wherein the washout region is projected back onto a cylinder representative of the ideal cylindrical borehole.

$r(\phi, z+\delta z)$ for round cylindrical holes is constant and the borehole intersection is an ellipse. When this ellipse is unrolled, the pattern seen in the image corresponds to a sinusoid. The amplitude of this sinusoid is a function of the dip angle, and its phase is a function of the orientation of the surface with respect to north (strike angle). For a non-cylindrical borehole, the intersection is not an ellipse and the pattern is a distorted sinusoid. Obviously, the amount of distortion depends upon the degree of departure of the borehole from a perfect cylinder. A representative borehole is shown in FIG. 2. Note the dip angle is the inclination of the plane relative to a horizontal reference. The strike angle is referenced to north as shown. FIG. 3 shows an extension of this to a wash out in a well and also includes a projection back to the true cylinder of FIG. 2.

The present disclosure is directed to a procedure for handling the data obtained from a BHTV inspection of an uncased borehole. Two or three simplifications are important to note. It is assumed that the BHTV data is collected from a centralized point within a circular borehole and represents the presence of a dipping boundary. The dip and strike angle of the boundary can be obtained ordinarily by measuring the amplitude and phase of the sinusoid in the data. The simplifications of BHTV centralization within a circular borehole are explained, see FIG. 3 above. In actuality, the BHTV data collection point may be off center or the well may be noncircular; the data needs additional preliminary treatment to obtain a representation of a centralized BHTV within a circular borehole. Such corrections avoid the manual corrections explained in *Geometric Aspects of Borehole Televiewer Images*, Daniel T. Georgi, SPWLA, 26th Annual Symposium, Jun. 17-20, 1985.

Figure 1:
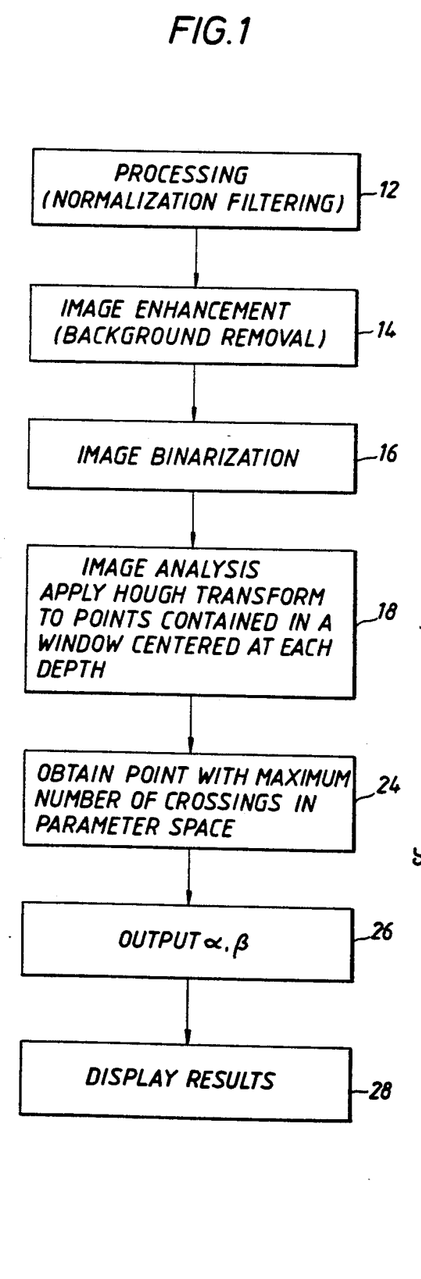
FIG. 1 is a flow chart of the data processing procedure set forth in the present disclosure for converting BHTV data into boundary dip and strike.
Figure 4:
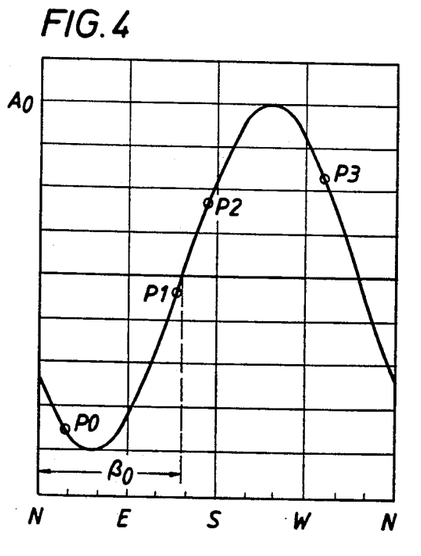
Figure 5:
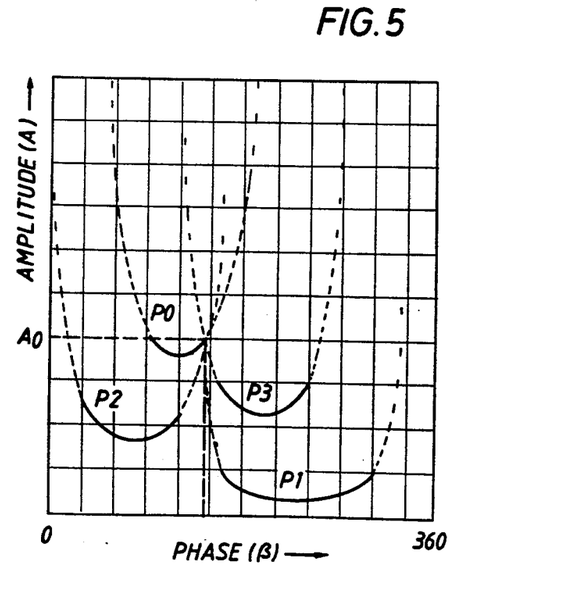
FIG. 5 is a plot of the points from the curve of FIG. 4 which have been plotted in parameter space and shows the point of intercept of the multiple points from the curve shown in FIG. 4.

Going to FIG. 1 of the drawings, this flow chart describes the sequence in which the data stream is first normalized at 12 and the background noise is removed to provide image enhancement at 14. The boundary is made more stark or bold by sharpening the boundary contrast. The data is preferably represented in the form of digital words of a specified number of bits, typically a gray scale of perhaps 256 shades, and the boundary contrast is sharpened so that it is more conspicuous. This step is shown in the step at 16, following the removal of background noise, makes the boundary more sharp so that it can be seen and recognized. That results in the formation of a sinusoid. One such sinusoid is represented in FIG. 5 of the drawings. This is illustrated for a boundary or interface which has a dip of specified angle A in degrees and the boundary strike is $\beta_0$ degrees. Recall that the BHTV organizes a data film where the azimuth of the BHTV is represented across the width of the film, meaning 360° across the width. The film or data record at the surface of the well obtained from the BHTV equipment forms a strip where the abscissa is scaled to 360° in the fashion shown in FIG. 4. The multiple points in FIG. 5 and the multiple curves in FIG. 5 will be explained later.

As mentioned previously, the pattern recognition scheme begins with a preliminary processing step before the actual selection of sinusoidal curve is performed. In this preconditioning stage, the image is passed through a special filter called a LoG (Laplacian of a Gaussian) filter, which serves to detect and enhance edges of horizontal features. Its output is binarized (i.e. the image is subdivided into two types of points: set points and background) to isolate those image points that are most likely associated with these horizontal events.

Horizontal events are characterized by changes in information when scanning the data vertically. These changes are seen as edges and detected by a filter whose output is a maximum when the original image contains a vertical edge.

Dickey and Shanmugan, see K. S. Shanmugan, F. M. Dickey, and J. A. Green *"An Optimal Frequency Domain Filter for Edge Detection in Digital Pictures"* IEEE Trans. Pattern Anal. Machine Intell., vol. PAMI-1, (January 1979) pp. 37-49, found an optimum filter for the detection of step edges. The LoG filter is an asymptotic approximation of this filters and is described by, $$LoG_x(\sigma) = \frac{d^2}{dx^2} G_x(\sigma) \quad (2)$$

where $G_x(\sigma)$ is either a one or two dimensional Gaussian function with zero mean and standard deviation $\sigma$, and x denotes the spatial dimension.

Figure 6:
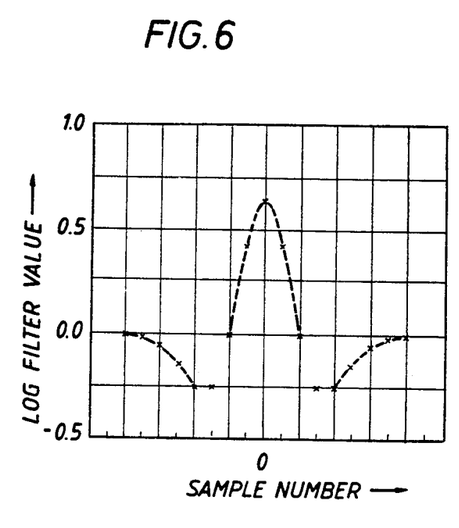
FIG. 6 shows the spatial characteristics for a LoG filter which is seventeen sample in length.
Figure 7:
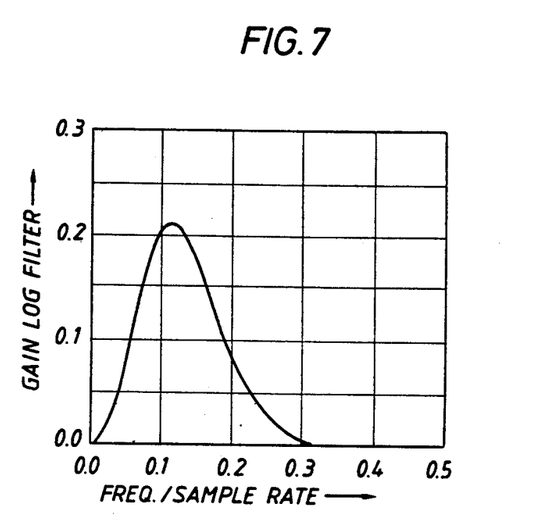
FIG. 7 shows the same filter of FIG. 6 and is the frequency characteristic of that filter.

The characteristics of a one dimensional LoG filter in both the spatial and frequency domain are sketched in FIGS. 6 and 7. Observe that the filter behaves like a band pass filter in that it attenuates both the low and high frequency components of the signal. The attenuation of the low frequency of the signal corresponds to the removal of background information which is mainly associated with borehole shape and tool position. The attenuation for the high frequency components eliminates high frequency noise and very fast changes.

D. Marr (see D. Marr and E. Hildreth *"Theory of Edge Detection"* Proc. R. Soc. London, vol. 207 (1980) pp. 187-217) established that the zero crossings of a LoG filtered signal yields the position of the center of the edges in a signal (or image). This property can be illustrated by performing the filtering operation on an arbitrary signal s(x). The filtering operation can be mathematically represented as a convolution of the signal with the response of the filter in the spatial domain. The filtered signal may be expressed as:

$$Fil(s(x)) = LoG_x(\sigma) * s(x) = \frac{d^2}{dx^2} G_x(\sigma) * s(x) \quad (3)$$

where * denotes convolution.

Since the derivative and convolution operations are both linear, they are commutative. Therefore, Equation (3) can be rearranged as Equation (4):

$$Fil(s(x)) = \frac{d^2}{dx^2} [s(x) * G_x(\sigma)] \quad (4)$$

The term within the brackets is the convolution of the signal with a Gaussian function. Therefore, filtering a signal with a LoG filter is equivalent to filtering the same signal with a Gaussian filter and taking its second derivative. The zero crossings of the second derivative of a signal represent the points of maximum change in the signal. Hence, the zero crossings of the LoG filter represent the location of fastest change in the signal or the edges of the signal. The parameter, $\sigma$ controls the length of the filter and the size of the edges that can be detected, see W. H. Luncher and M. P. Beddoes, *"Optimal Edge Detector Design I: Parameter Selection and Noise Effect"* IEEE Trans. Pattern Anal. Machine Intell., vol. PAMI-8, (March 1986) pp. 164-167.

Since the primary interest is in horizontal events, which change only in the vertical direction, a one dimensional version of the LoG filter suffices. Consequently, this processing not only alleviates the computational burden of a two dimensional convolution, but also eliminates undesirable vertical events.

The Hough Transform is a transform from a defined coordinate system to a different coordinate system as is more fully explained in the article of *Use of the Hough Transform to Detect Lines and Curves in Pictures*, Duda, R. P. and Hart, P. E., ACM, v. 15, n. 1 pp. 11-15. The Hough Transform technique was initially developed to detect straight lines in binary images. However, due to its simplicity, the technique was extended to detect other type or simple analytic shapes like circles and ellipses and is used today to recognize patterns even when they do not have an analytic description, see J. Illingworth and J. Kittler, "A Survey of the Hough Transform" Computer Vision, Graphics and Image Processing, vol. 44, (1988) pp. 87-116.

Figures 8, 10:
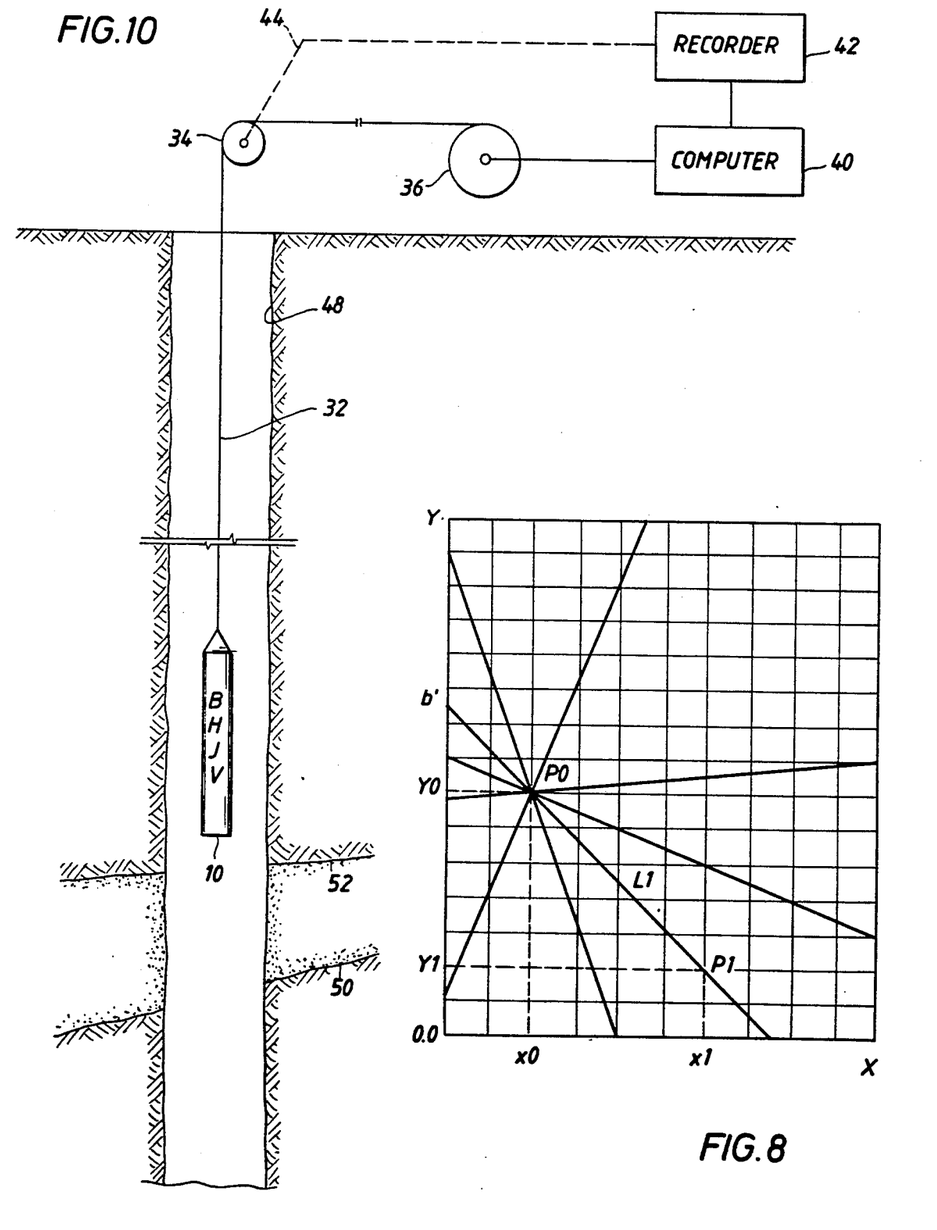
FIG. 8 shows lines in image space of X and Y coordinates which pass through a point $P_O$.
FIG. 10 is a typical well intercepting various horizons which have different dip and strike angles which have been determined by the Hough Transform of the present disclosure.

The technique achieves its results by determining the specific parameters that characterize a shape. In the case of a straight line these parameters are slope and intercept. To illustrate how it works, consider a point with coordinates $x_0$, $y_0$ in an image (FIG. 8) and observe that although there is an infinite number of lines that pass through this point, they belong to the family of lines described by the equation:

$$y_0 = m \cdot x_0 + b \qquad (5)$$

m and b are the slope and intercept of all possible lines that pass through the point $x_0$, $y_0$.

Since $x_0$ and $y_0$ are fixed values, m can be expressed as a function of b, $$m(b) = \frac{y_0}{x_0} - \frac{b}{x_0} \qquad (6)$$

Figure 9:
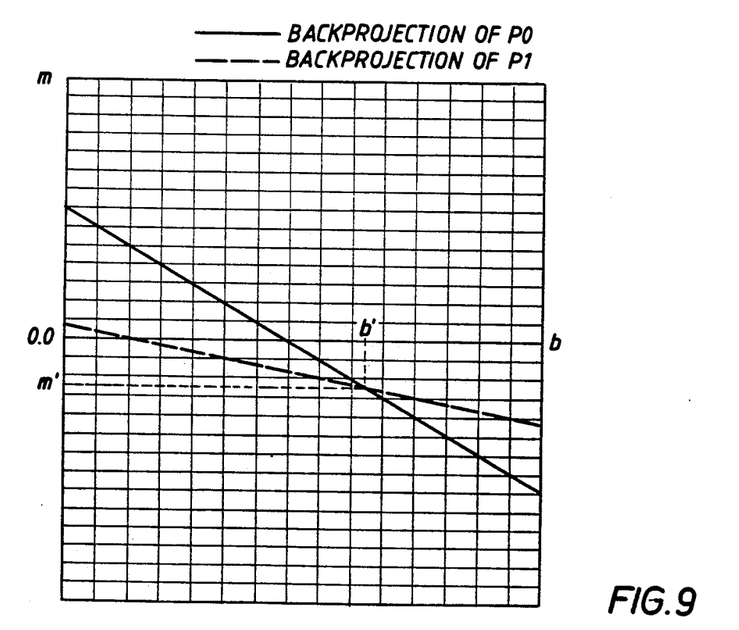
FIG. 9 shows the lines plotted in FIG. 8 in parameter space having the coordinates of m and b.

The plot of this function in a [m, b] space (see FIG. 9) describes a straight line with a slope of $-1/x_0$ and an intercept of $y_0/x_0$. The space [m, b] is called the parameter space and the line described here is referred to as the back-projection of the point ($x_0$, $y_0$) in the parameter space.

Similarly, the back-projection of another point ($x_1$, $y_1$) is also a straight line. This line will intercept the back-projection of ($x_0$, $y_0$) at a point (m', b'). The coordinates of this point are the slope and intercept values of the straight line $L_1$ that joins ($x_0$, $y_0$) and ($x_1$, $y_1$) in the image space.

Indeed, the back-projection of any point that belongs to the line $L_1$ will pass through the point (m', b'). Therefore, by finding the intersection point of the back-projections of two or more points that belong to the line, the parameters of the line can be obtained. One of the important features of the technique is that the results obtained are very robust in the presence of noise or missing data. In a noise free binary image of a line, only those points that belong to the line are set points, whereas the noise in the binary image creates additional set points that are not on the line of interest. In this case, the parameter space contains other points in which the back-projected lines intersect. However, the point (m', b') contains the greatest number of intersections and this information is used to discriminate against the false intersections due to noise. In the case of missing data, the point (m', b') will still be found with the intersection of the back-projections of the available data points.

THE HOUGH TRANSFORM APPLIED TO DIPPING EVENTS

As mentioned previously and shown in FIGS. 2 and 3, the image produced by dipping events that intersect the borehole is described by Equation (1). Before deciding specifically which parameters to use in conjunction with the Hough Transform, the equation will be studied so as to make some conjectures about the points to emphasize. First of all, in the case of a cylindrical borehole $r(\phi, z+\delta z)$ is a constant so that Equation (1) can be written as Equation (7):

$$\delta z = A \sin(\phi - \beta) \qquad (7).$$

Here, $\delta z$ and $\phi$ are regarded as describing the coordinates of the image space with the parameters of the sinusoid to be determined by back-projection. Unfortunately, most boreholes are irregular in shape (e.g., see FIG. 3) and the amplitude coefficient, A, varies with every image point. Consequently, the estimation of $\alpha$ from A depends upon the value of r used. An inappropriate value of r results in an erroneous value of $\alpha$. This problem can be eliminated from the images obtained with the CAST tool mentioned above because the borehole shape (i.e. correct r) can be found at every point from the time of flight measurements. Equation (7) can be used legitimately by determining a corrected $\delta z_c(\phi)$ which represents the $\delta z(\phi)$ that would be measured if the tool were centered in a cylindrical borehole of radius $r_n$. This $\delta z_c(\phi)$ is determined with the aid of FIG. 3 and is described mathematically as, $$\delta z_c(\phi) = \delta z(\phi) \frac{r_n}{r(\phi, \delta z)} \qquad (8)$$

The pattern drawn in this cylindrical hole by the dipping interface is legitimately described by Equation (7) with $\delta z$ replaced by $\delta z_c$ and, of course, the dip angle follows from, $$\alpha = \tan^{-1}\left(\frac{A}{r_n}\right) \qquad (9)$$

Notice from Equation (9) that the value of the dip angle is determined from the ratio of A and $r_n$. Obviously, $r_n$ cancels and the exact value of $r_n$ is arbitrary.

A sliding window is used to center the patterns in a coordinate system. The window slides in the depth direction, with a width equal to the width of the image and a height equal to twice the maximum expected amplitude. Only the information contained in this window is processed. As the window slides, there will be one depth at which the pattern is centered and the algorithm finds the parameters of a centered sinusoid.

As in the case of straight lines, each set point in the image space is back-projected to the parameter space. In this case, the back-projection equation is:

$$A(\beta) = \frac{\delta z_c(\phi_0)}{\sin(\phi_0 - \beta)} \qquad (10)$$

where $\delta z_c(\phi_0)$ and $\phi_0$ are the coordinates of the set point in the cylindrical borehole.

Each of the mapped curves represents the loci of the parameters of all possible patternss that can pass through the point ($\delta z_c(\phi_0)$, $\phi_0$). When all the points that belong to a feature are back-projected, the coordinates of the point of intersection of these curves represent the amplitude and phase of the sinusoid.

Briefly, the Hough Transform as applied to the present circumstance makes a transform into parameter space defined by two dimensions, the dimensions directly or inferentially being the dip and strike angles. Accordingly, the curve shown in FIG. 4 is a transform of a point of a dipping plane with a representative dip angle $A_0$ versus strike angle $\beta$ as shown in FIG. 4 coordinates. Applying this characteristic of the transform to a representative curve, such as that shown in FIG. 4, the next step 18 (see FIG. 1) is implemented by defining several points on the curve in FIG. 4. For instance, four points have been arbitrarily selected in this curve, the points being identified at $P_0$, $P_1$, $P_2$ and $P_3$ on the curve. The four points are thus transformed to yield the four curves which are marked as $P_0$, $P_1$, $P_2$ and $P_3$ in FIG. 5 of the drawings. The four curves are graphed as shown in FIG. 5 and have an area (hopefully, a single point) of interception. The interception provides a readout of the dip angle $A_0$ and strike angle $\beta_0$ as shown. The precision at which the curves $P_0$, $P_1$, $P_2$ and $P_3$ intercept is dependent on the accuracy in locating the points on the curve, that is, the data from the prior steps 12, 14 and 16 in processing the data. Thus, if the points $P_0$, $P_1$, $P_2$ and $P_3$ on the curve are slightly inaccurately placed, it will be understood that the intercept will not be precisely accomplished by all the four curves. Restated, it is possible for erroneous data to be obtained whereby one or more curves will intercept poorly.

The clarity of the sinusoidal curve in FIG. 4 is useful in a tutorial sense but actual data is normally quite ambiguous. The sinusoidal curve, one or more, cannot be easily seen, and indeed, some portion of it may be missing. The more common form of data is simply a set of pixels, some showing a data point and some showing no data (recall the prior mention of a two value or two color system). In that instance, thousands of points $P_0 \ldots P_n$ are transformed from image space (for example, see FIG. 4) into parameter space (for example, see FIG. 5). The distribution of curves in parameter space makes interpretation much easier. FIG. 5 is an example which hints at the common interception of curves from a common sinusoidal image space curve. When $P_n$ is several hundred points, or even more, then the interception coordinates of amplitude and phase angle are quite sharply defined, even if parts of the data are missing or distorted.

The common and correct intercept identifying dip and strike angles is obtained in this fashion. If there is some scatter, those interceptions which are most remote from the common interception point can be discarded on the premise that inaccuracies or distortions in data occurred. As a generalization, the transformation of multiple data points (up to N data points) reduces error and enables a more accurate determination of the dip and strike angles. In any event, and referring back to FIG. 1 of the drawings, the intercept point is tested to determine accuracy of the number of curves intercepting at that point. This is the step represented at 24 in FIG. 1. When that interception is verified, the next step is to make the inverse transformation thereby obtaining the dip and strike angles. This is represented by the step 26 and the data is then provided to an output step 28.

The foregoing describes how a single sinusoid is handled where the single signal derives from a single boundary event. The data from a selected region is processed to locate an interface; the region is progressively shifted along the borehole to enable progressive, examination of the desired length, ultimately locating many different interfaces. The BHTV process is continued up the borehole and additional data is obtained. The process is thus continued for each boundary, and the dip and strike angles are again determined.

The foregoing process may be typically carried out while the BHTV apparatus is pulled up the well. This is exemplified in FIG. 10 of the drawings. There, a BHTV measuring apparatus 30 is supported on a logging cable 32 which extends to the surface and passes over a sheave 34. The cable is spooled on a drum 36. The cable includes one or more electrical conductors which provides the output signal from the BHTV 30 to a CPU 40. The CPU is loaded with a program in accordance with the flow chart of FIG. 1. The data, meaning the dip and strike angles, determined by the program of FIG. 1 is output to a recorder 42. An electrical or mechanical depth measuring device 44 operates from cable movement to provide a signal to the recorder 42 so that the data is recorded as a function of depth in the well.

The well 48, illustrated in FIG. 10, intercepts two representative boundaries shown in FIG. 10. The boundary 50 is shown at a specific dip and strike angle while the boundary 52 has different angles of dip and strike. For each, the BHTV will recognize the boundary data in the film, and the process described by the present disclosure will determine the dip and strike angle for the two boundaries 50 and 52. That will be output at the recorder 42 as a function of depth. By this process, the depth of the boundaries 50 and 52 is correlated to the strike and dip. Coupled with other sources of formation information, a full and complete description of the formations can be obtained. This enables subsequent well completion techniques to be carried out in accordance with the determinations made.

Another data source in addition to the BHTV which can be used is a dipmeter, and particularly the type of dipmeter which furnishes six traces rather than the conventional four traces. The six traces are normally spaced at sixty degrees azimuth around the instrument. Assume that the dipmeter intercepts an interface which causes a measurable change in resistivity. Assume further that the interface has unknown dip and strike values. In that instance, these six intercepts will provide points in image space. Whether four or six dipmeter traces are initially available, the next step is to extrapolate between traces to then provide data fully around the borehole, or across the full width of the film. The extrapolation is made by smoothing the data around the full circle of the borehole in azimuth. This is done progressively along the borehole until the data for the full circle of azimuth has been extrapolated. Thereafter, the dipmeter data with extrapolation is processed in the same fashion as the BHTV data. Once the data is extrapolated, the processing of FIG. 1 may be implemented. The Hough Transform can be taken and the dip and strike of the interface can be determined.

The present procedure can be applied to other types of systems which provide a plot of wall or surface measurements along the well borehole. Such measurements are ideally represented on a film strip or data tape arranged as described, namely where the azimuth of 360° is represented in the horizontal dimension, and the centerline axis of the borehole defines the vertical axis in the same fashion as shown in the present disclosure and the drawings. As will be understood, dip and strike is measured relative to the borehole. The borehole may be at some angle in the earth; hence, the present system indicates relative dip and strike and a borehole survey device may be required to indicate dip and strike of the borehole from which absolute dip and strike is subsequently determined.

While the foregoing is directed to the preferred embodiment, but the scope is determined by the claims which follow:

What is claimed is:

1. A method of determining dip and strike angles of an earth formation, boundary, or interface of earth formations in the vicinity of a well borehole wherein the method comprises the steps of:
   (a) with a high frequency ultrasonic scanning tool, forming a record of data viewed by the scanning tool in a well borehole to record the scanning tool data including a sinusoid as the representative of an interface;
   (b) from the scanning tool data record defined by a set of record scanning tool data pixels, converting the pixels into a set of binary numerical values where selected pixels encode ultrasonic scanning tool data possibly describing a formation boundary or interface;
   (c) making a Hough Transform into parameter space of the encoded scanning tool data pixels where the parameter space is dimensioned by earth formation dip and strike angles;
   (d) plotting the encoded pixels after transform into parameter space and computing an intercept of the encoded pixels in the parameter space where the intercept is dimensionally described by earth formation dip and strike angle values and wherein the intercept is an expression of dip and strike angles of the scanned earth formations; and
   (e) recording said dip and strike angles as a function of the borehole depth of said ultrasonic tool.

2. The method of claim 1 including the step of recording said ultrasonic tool data as a film strip with a width scaled to equal 360 in azimuth.

3. The method of claim 2 including the step of presenting said ultrasonic tool data in a gray scale.

4. The method of claim 3 including the step of encoding said ultrasonic tool data as a multibit word where sinusoid contrast is enhanced.

5. The method of claim 4 wherein said ultrasonic tool data is recorded with well depth as the ordinate.

6. A method of determining the location of a formation boundary in a well borehole penetrating the formation wherein the method comprises the steps of:
   (a) moving a rotary scanning ultrasonic measuring device along a well borehole to form a depth related record of data representative of the borehole sidewall which data includes a sinusoidally shaped curve representative of a formation boundary intersected by the borehole;
   (b) for selected points along the data representing a vertical depth interval in said data record, making Hough Transform of said selected points into parameter space;
   (c) limiting the points of the record for transform to those within a predetermined vertical depth window relative to a selected depth;
   (d) plotting the transformed points in a parameter space having coordinates yielding dip and strike to obtain intercepts of curves defined by the points and representing dip and strike angles of the formation boundary; and
   (e) recording said dip and strike angles as a function of borehole depth.

7. The method of claim 6 including the step of defining the depth related record based on borehole sidewall ultrasonic signal reflection amplitude and an azimuth rotary transducer angle from the axis of the borehole.

8. The method of claim 6 including the step of projecting measured rotary ultrasonic scanning tool data to a cylindrical surface representative of a true cylindrical surface.

9. The method of claim 6 including the step of projecting the measured data onto a data record having edges defined at a selected azimuth.

10. The method of claim 6 wherein the measured data is ultrasonic scanning tool data in binary form and having color intensity encoding.

11. The method of claim 10 including the step of recording ultrasonic tool reflection pulse response amplitude as a function of travel time of said ultrasonic pulses in the borehole fluid.

* * * * *